（12）United States Patent
Maezawa

(10) Patent No.: US 8,468,905 B2
(45) Date of Patent: Jun. 25, 2013

(54) OPERATING DEVICE FOR CONTROL VALVE

(75) Inventor: Kiyoshige Maezawa, Kishiwada (JP)

(73) Assignee: Kubota Corporation, Osaka (JP)

( * ) Notice: Subject to any disclaimer, the term of this patent is extended or adjusted under 35 U.S.C. 154(b) by 1051 days.

(21) Appl. No.: 12/402,147

(22) Filed: Mar. 11, 2009

(65) Prior Publication Data

US 2010/0006789 A1    Jan. 14, 2010

(30) Foreign Application Priority Data

Jul. 14, 2008  (JP) ................................ 2008-182873

(51) Int. Cl.
*B60K 20/00* (2006.01)

(52) U.S. Cl.
USPC ..... 74/473.3; 74/473.1; 74/473.11; 74/473.2; 74/473.21; 74/473.34

(58) Field of Classification Search
USPC .............. 251/114, 90, 116; 137/636.2; 239/1; 74/473.1, 473.11, 473.2, 473.21, 473.3, 473.34
See application file for complete search history.

(56) References Cited

U.S. PATENT DOCUMENTS

| | | | |
|---|---|---|---|
| 2,297,992 A | 10/1942 | Swim | |
| 2,330,283 A | 9/1943 | Hipple | |
| 2,638,045 A | 5/1953 | Heitshu | |
| 4,183,287 A | 1/1980 | Hamada et al. | |
| 4,389,151 A * | 6/1983 | Brown | 414/685 |
| 4,643,442 A | 2/1987 | Ohashi et al. | |
| 4,733,745 A | 3/1988 | Lumpkins | |
| 5,487,493 A * | 1/1996 | McNabb | 222/153.14 |
| 5,497,847 A * | 3/1996 | Ota et al. | 180/333 |
| 5,720,214 A | 2/1998 | Kawamura et al. | |
| 2008/0016976 A1 * | 1/2008 | Fukudome et al. | 74/471 XY |
| 2008/0296032 A1 | 12/2008 | Masumoto | |

FOREIGN PATENT DOCUMENTS

| | | |
|---|---|---|
| JP | 5788223 U | 5/1982 |
| JP | A-4-110406 U | 9/1992 |
| JP | 573051 U | 10/1993 |
| JP | 2004-360331 | 12/2004 |

* cited by examiner

*Primary Examiner* — Jason J Boeckmann
*Assistant Examiner* — Joel Zhou
(74) *Attorney, Agent, or Firm* — The Webb Law Firm

(57) ABSTRACT

An operating device with an operating lever for a control valve includes: an input member connected to the operating lever; an output member connected to a slide spool of the control valve; and a swing link for relaying a displacement of the input member to the output member. The swing link is swingable about a swing shaft center on one end and is connected to the input and output members. A latch portion in the swing link is farther than a connecting point with the output member from the swing shaft center. A lock body is switchably operable between a lock position and a release position, and at the lock position, engaged with the latch portion at a neutral position to limit a swing of the swing link about the swing shaft center by which the control valve is locked at a neutral state.

9 Claims, 12 Drawing Sheets

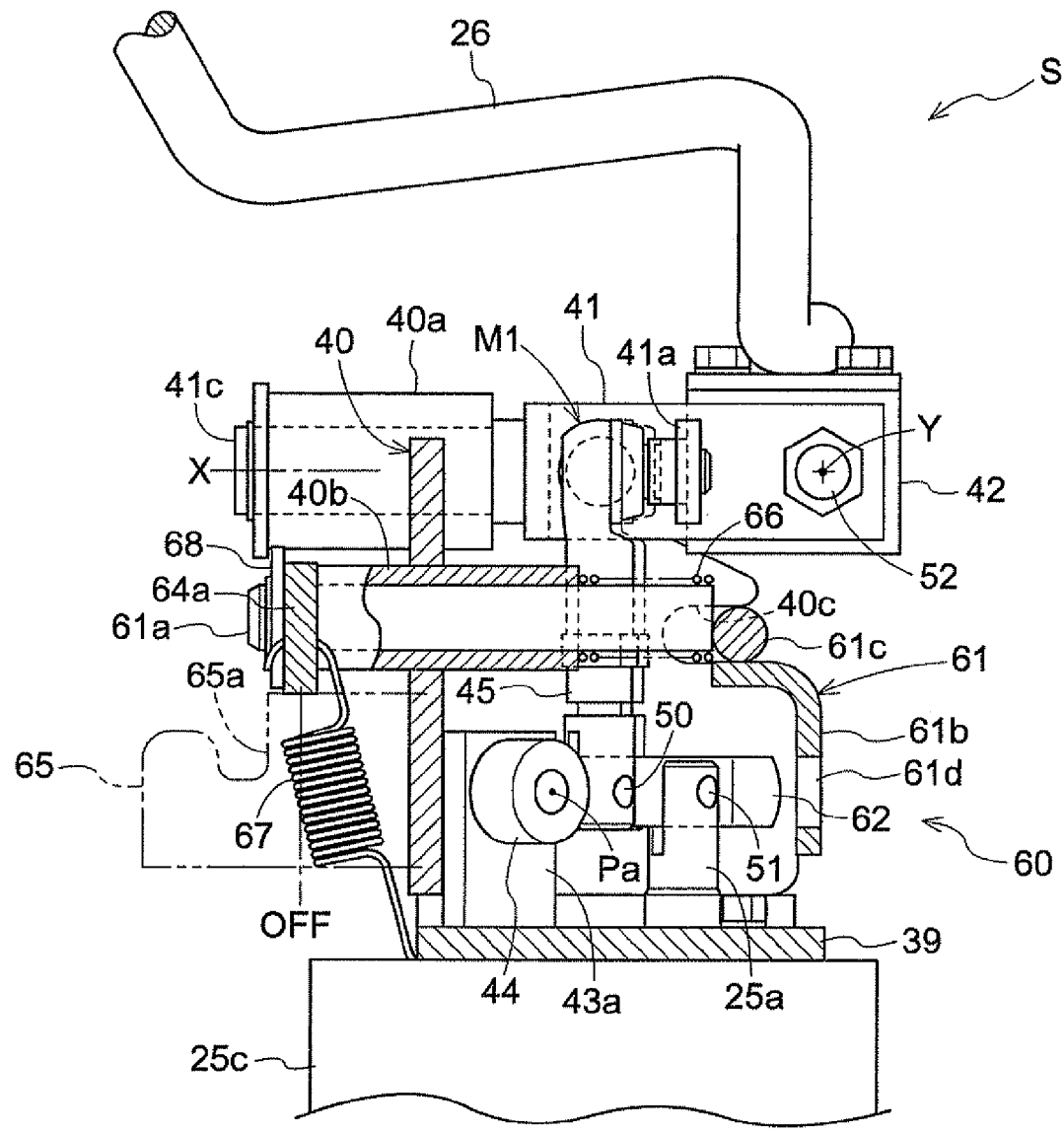

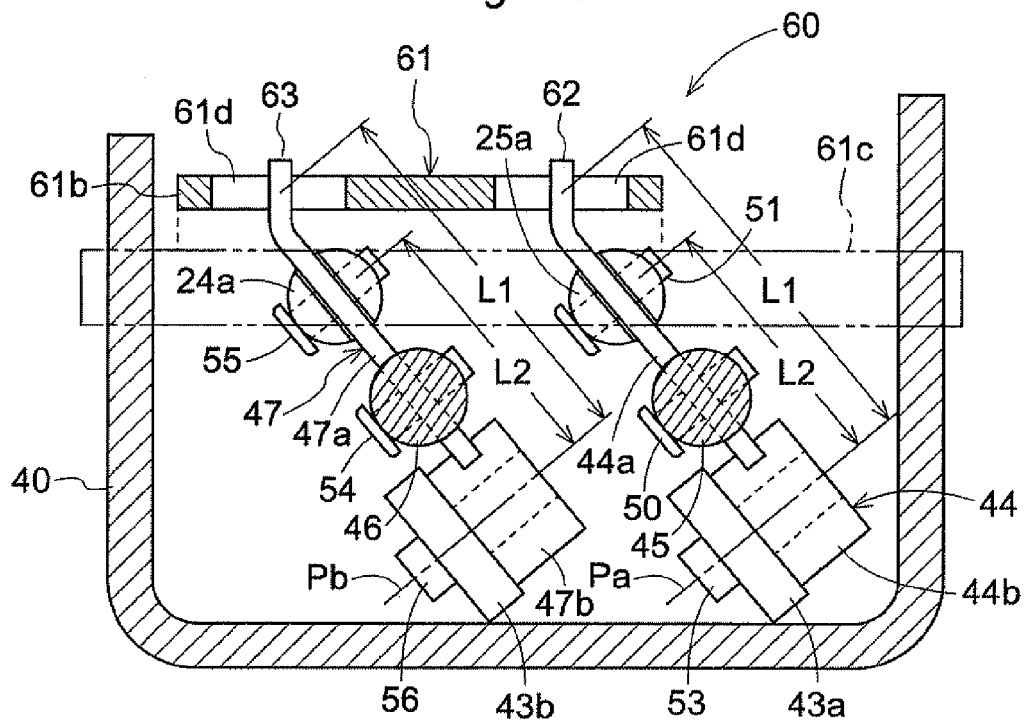
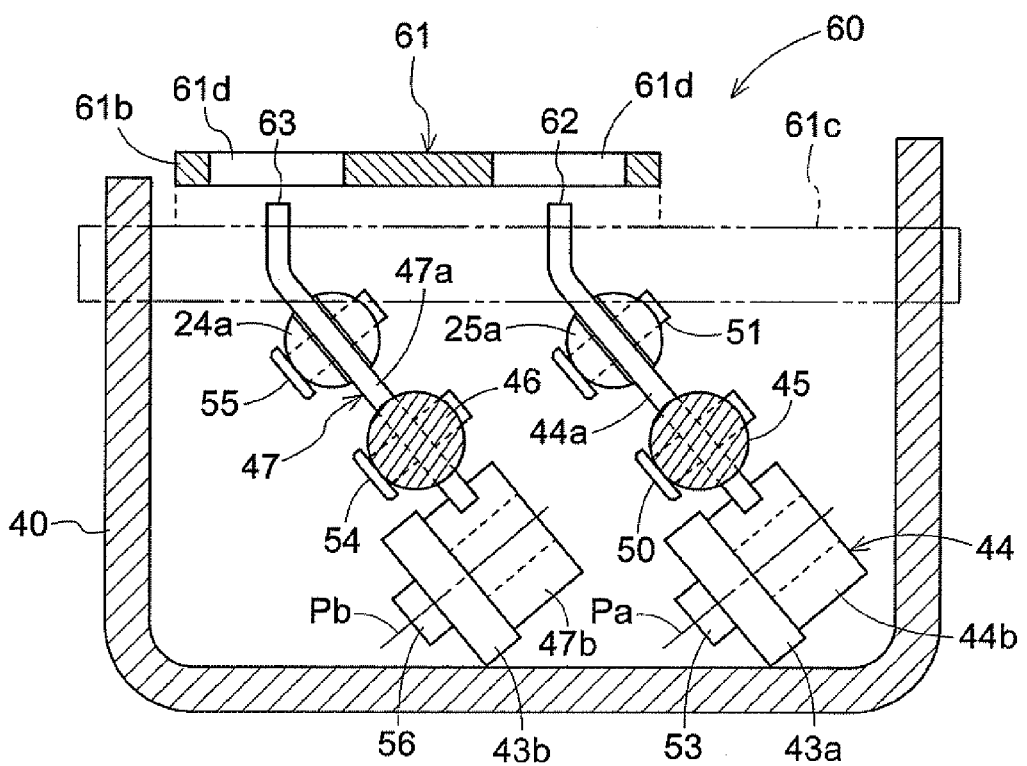

OPERATING DEVICE FOR CONTROL VALVE

BACKGROUND OF THE INVENTION

1. Field of the Invention

The present invention relates to an operating device having an operating lever for operating a control valve connected to an actuator, especially an operating device mounted on a work vehicle.

2. Description of the Related Art

Such an operating device for a control valve, there has been known a device disclosed in Japanese patent application JP2004-360331A which includes: a first operating lever for operating a first control valve for controlling a boom cylinder, and a second control valve for controlling a bucket cylinder; and a second operating lever for operating a third control valve for controlling an actuator provided in a front loader. The first operating lever is supported by first and second supporting members, through a mount body whose upper face holds the first operating lever, and also through a swing frame to which the mount body is swingably connected by a second spindle. The swing frame is swingably supported by the first and second supporting members through a first spindle. The swing frame has a mount piece extending therefrom which is uniformly swingable with the swing frame. The mount piece is connected to a slidable spool of the first control valve through a first interlocking member which has a main link, an upper mount piece fixed to an upper portion of the main link, and a lower mount piece fixed to a lower portion of the main link. The upper mount piece is pivotally connected to the mount piece of the swing frame through a pin, and the lower mount piece is pivotally connected to the spool of the first control valve through a pin. The mount body has a spindle uniformly swingably attached thereto. The spindle is connected to a slidable spool of the second control valve through a second interlocking member which has a main plate, a mount shaft fixed to an upper portion of the main plate, and a lower mount piece fixed to a lower portion of the main plate. The mount shaft is connected to the spindle of the mount body through a ball joint, and the lower mount piece is pivotally connected to the spool of the second control valve. In the operating device having such a structure, the first operating lever is swingably operable about the axis of the first spindle and the axis of the second spindle. When the first operating lever is swingably operated about the axis of the first spindle, the swing frame is swung to push and pull the spool through the first interlocking member, which enables an operation of the first control valve. When the first operating lever is swingably operated about the axis of the second spindle, the mount body is swung to push and pull the spool through the second interlocking member, which enables an operation of the second control valve. The second operating lever is swingably and operably attached to a mount wall. The second operating lever has a boss portion and a connection arm which is uniformly swingably attached to the boss portion. The connection arm is connected to a slidable spool of the third control valve through a third interlocking member which has a main link, an upper mount piece attached to an upper portion of the main link, and a lower mount piece attached to a lower portion of the main link. The upper mount piece is pivotally connected to a connection arm of the second operating lever through a pin, and the lower mount piece is pivotally connected to the spool of the third control valve through a pin. Accordingly, when the second operating lever is swingably operated, the spool is slid through the third interlocking member, which enables an operation of the third control valve.

The operating device disclosed in Japanese patent application JP2004-360331A has a lock mechanism for locking the first control valve, the second control valve and the third control valve at a neutral state, with a use of a lock pin. In this lock mechanism, by shifting a locking lever connected to the lock pin through a support arm to thereby moving the lock pin along a bore in a pin holder, the lock pin is switched between a lock position and a lock release position. When the lock pin is switched to the lock position, a front end portion of the lock pin is inserted into insert holes of the first and second interlocking members, to thereby limit a movement of the first and second interlocking members, by which the first and second control valve are locked at a neutral state. A second lock portion formed in a rear end portion of the lock pin is fitted into a fitting portion of a through hole of a third interlocking member to thereby limit a movement of the third interlocking member, by which the third control valve is locked at a neutral state. When the lock pin is switched to the lock release position, the front end portion of the lock pin is removed from the insert holes of the first and second interlocking members, by which the locking of the first and second control valves at a neutral state is cancelled, and the second lock portion of the lock pin is removed from the fitting portion of the third interlocking member, by which the locking of the third control valve at the neutral state is cancelled.

In work vehicles, it is necessary to lock the control valves at a neutral state, in order to retain the work part in an operating state during a pause of working or during traveling. In the case where the above-mentioned conventional technique is applied, a feeling of locking operation tends to become heavy, or accuracy in locking tends to become poor. As a result, shakiness caused between the lock pin and insert hole of the interlocking member engaged with each other may adversely affect on the control valve. In order to make the feeling of locking operation lighter, the engagement of the lock pin with the insert hole should be facilitated. One possible solution is to make the insert hole larger. However in this case, shakiness caused between the lock pin and the insert hole engaged with each other becomes larger, and when the control valve is in a locking state, looseness (play) of the spool of the control valve becomes larger, due to shakiness caused between the lock pin and the insert hole.

On the other hand, in order to attain locking of the control valve with high accuracy, shakiness caused between the lock pin and the insert hole engaged with each other should be suppressed so as to suppress looseness of the spool of the control valve during a locking state. One possible solution is to make the insert hole smaller, just enough for the lock pin to be engaged. However in this case, the engagement of the lock pin and the insert hole with each other is less facilitated, and the feeling of locking operation becomes heavy.

SUMMARY OF THE INVENTION

Accordingly, it would be desirable to provide an operating device in which a locking operation with a light feeling as well as in a neutral locking of a control valve with high accuracy can be obtained.

Therefore, one aspect of the present invention is to provide an operating device with an operating lever for operating a control valve connected to an actuator including: an input member to which an operational displacement of the operating lever is transmitted; an output member connected to a slide spool of the control valve; a swing link configured to relay a displacement of the input member to the output member, the swing link being swingable about a swing shaft center defined on one end of the swing link and being connected to the input member and the output member; a latch portion formed in the swing link on a free end side at a position farther than a connecting point with the output member from the swing shaft center; a lock body switchably operable between a lock position and a release position, the lock body at the lock position being engaged with the latch portion of the swing link at a neutral position to limit a swing motion of the swing link about the swing shaft center by which the control valve is locked at a neutral state, and the lock body at the release position releasing the latch portion to cancel a limitation of the swing motion of the swing link by which a locking of the control valve is released.

According to this configuration, when the lock body is switched to a lock position, the lock body is engaged with the latch portion of the swing link, to thereby limit a swing movement of the swing link, and as a result, the control valve is locked at a neutral state.

In this case, a distance from the swing shaft center to the latch portion of the swing link is set larger than a distance from the swing shaft center to the connecting point of the swing link with the output member. Due to a ratio of the distance from the swing shaft center to the connecting point with the output member to the distance from the swing shaft center to the latch portion, shakiness caused between the lock body and the swing link engaged with each other is reduced, which is then transmitted to the spool of the control valve. As a result, shakiness caused between the lock body and the swing link engaged with each other affects less on the control valve than shakiness in the case of the prior art. Therefore, even when the lock body and the swing link engaged with each other under a condition that may cause relatively large shakiness, a degree of looseness generated in the spool of the control valve at a lock position can be made smaller than a degree of shakiness caused between the lock body and the swing link.

Accordingly, by locking the control valve with high accuracy with less looseness of the spool, the actuator controlled by the control valve can be retained at a desired operational position with high accuracy. In addition, since this locking structure does not adversely affect on the locking operation, the locking operation with a light feeling can be assured. As a result, an operating device with an excellent liability and an excellent operability can be obtained.

In a preferred embodiment, it is proposed that the output member is a connecting pin configured to connect the swing link and the slide spool.

According to this configuration, looseness caused between the swing link and the spool can be reduced to a small degree as looseness derived from the connecting pin, and looseness of the spool when locking the control valve in a neutral state can be reduced from this viewpoint.

Other features and advantages of the present invention will become apparent from the descriptions of embodiments below, with reference to the attached drawings.

BRIEF DESCRIPTION OF THE DRAWINGS

FIG. 10 is a front view of the lock mechanism at a lock release position.
FIG. 11A is a plan view of the lock mechanism at a lock position.
FIG. 11B is a plan view of the lock mechanism at a lock release position.

DETAILED DESCRIPTION OF THE PREFERRED EMBODIMENTS

Hereinbelow, an embodiment of the present invention will be described with reference to the drawings.

Figure 1:
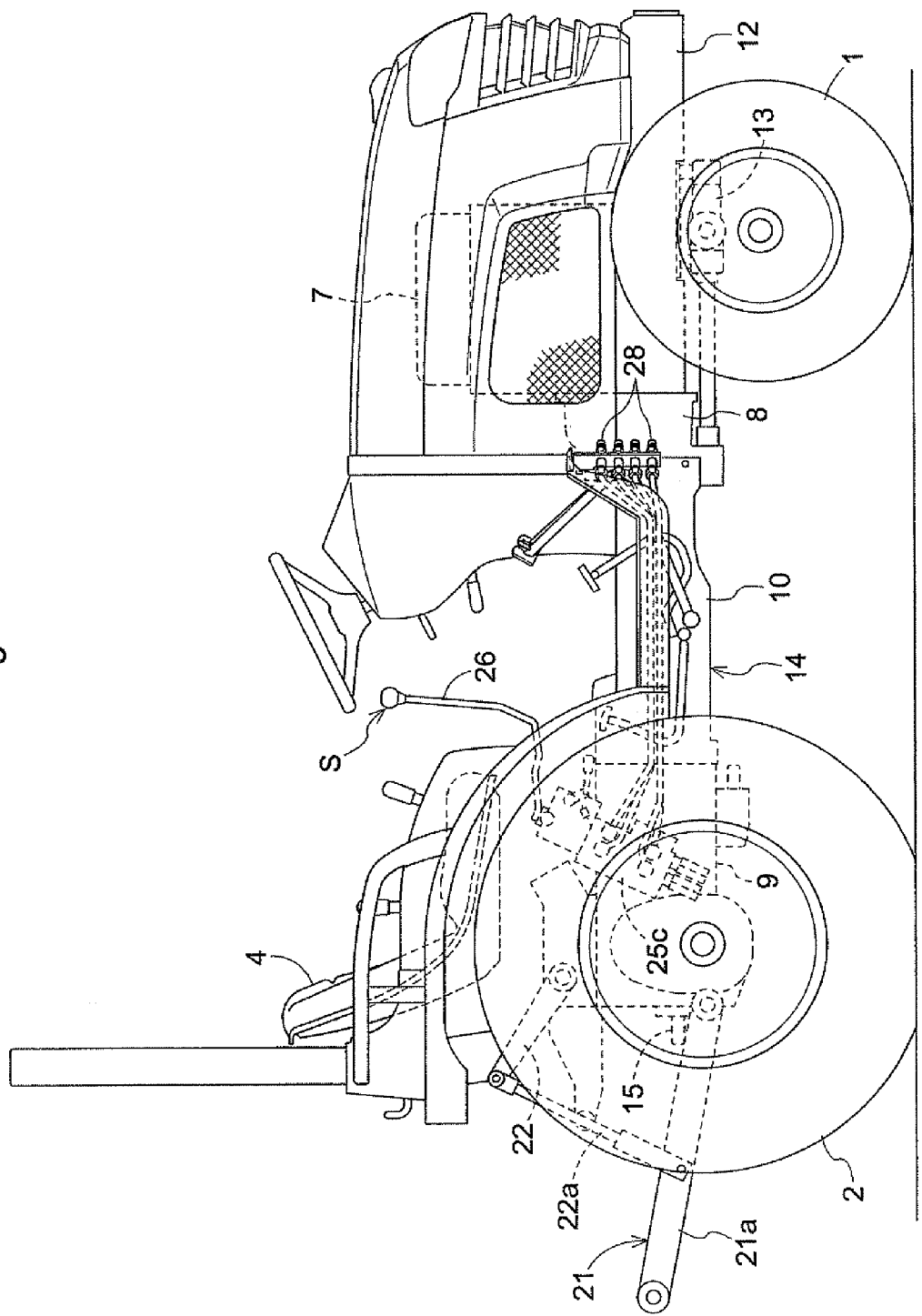
FIG. 1 is an overall side view of a work vehicle.
Figure 2:
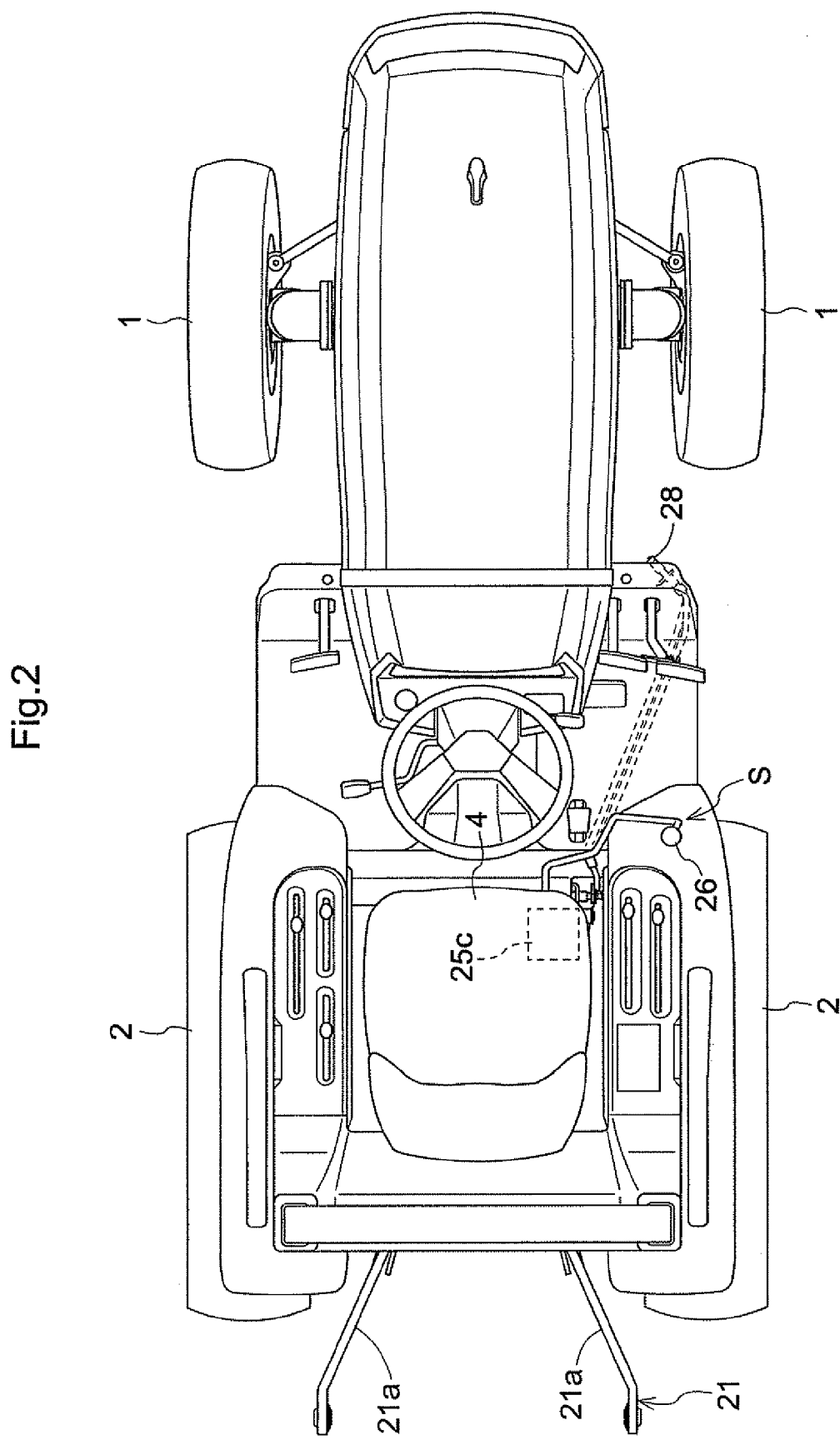
FIG. 2 is an overall plan view of the work vehicle.

FIG. 1 is an overall side view of a work vehicle having an operating device S, according to an embodiment of the present invention. FIG. 2 is an overall plan view of the work vehicle having the operating device S, according to the embodiment of the present invention. As shown in these drawings, the work vehicle is automotive with a pair of steerable and drivable right and left front wheels 1,1 and a pair of drivable right and left rear wheels 2,2, and has a motor part provided with an engine 7 in a front portion of a vehicle body, and a driving part provided with a driver's seat 4 in a rear portion of the vehicle body. To a rear end portion of a body frame 14 of the work vehicle, a link mechanism 21 including a pair of right and left lower links 21a,21a each swingable in a vertical direction is attached, and a power takeoff shaft 15 is installed.

To the rear portion of the vehicle body, a rotary tiller unit (not shown) can be connected through the link mechanism 21 in such a manner that the rotary tiller unit is lifted and lowered. By transmitting drive power of the engine 7 through the power takeoff shaft 15 to the rotary tiller unit, the work vehicle can serve as a riding type tiller.

Specifically, the body frame 14 of the vehicle supports the engine 7, a clutch housing 8 connected to a rear portion of the engine 7, a transmission case 10 connected to the clutch housing 8, a transmission case 9 connected to a rear portion of the transmission case 10, and a front wheel support frame 12 connected to a lower portion of the engine 7.

The rear wheels 2,2 are drivably supported on lateral sides of the transmission case 9, and the power takeoff shaft 15 is drivably supported by a rear end portion of the transmission case 9. The pair of right and left front wheels 1,1 are steerably and drivably supported by the front wheel support frame 12 through a front wheel drive case 13.

In addition to the pair of right and left lower links 21a,21a, the link mechanism 21 includes: a pair of right and left lift arms 22,22 supported swingably in a vertical direction by an upper portion of the transmission case 9; a lift rod 22a on the left side connecting the left lift arm 22 and the left lower link 21a; and a lift rod 22a on the right side connecting the right lift arm 22 and the right lower link 21a.

The link mechanism 21 is configured to swing the pair of right and left lift arms 22,22 in a vertical direction by a hydraulic cylinder (not shown) located in the transmission case 9, to thereby swing the pair of right and left lower links 21a,21a in a vertical direction relative to the transmission case 9, by which the rotary tiller unit connected thereto is lifted or lowered.

Figure 3:
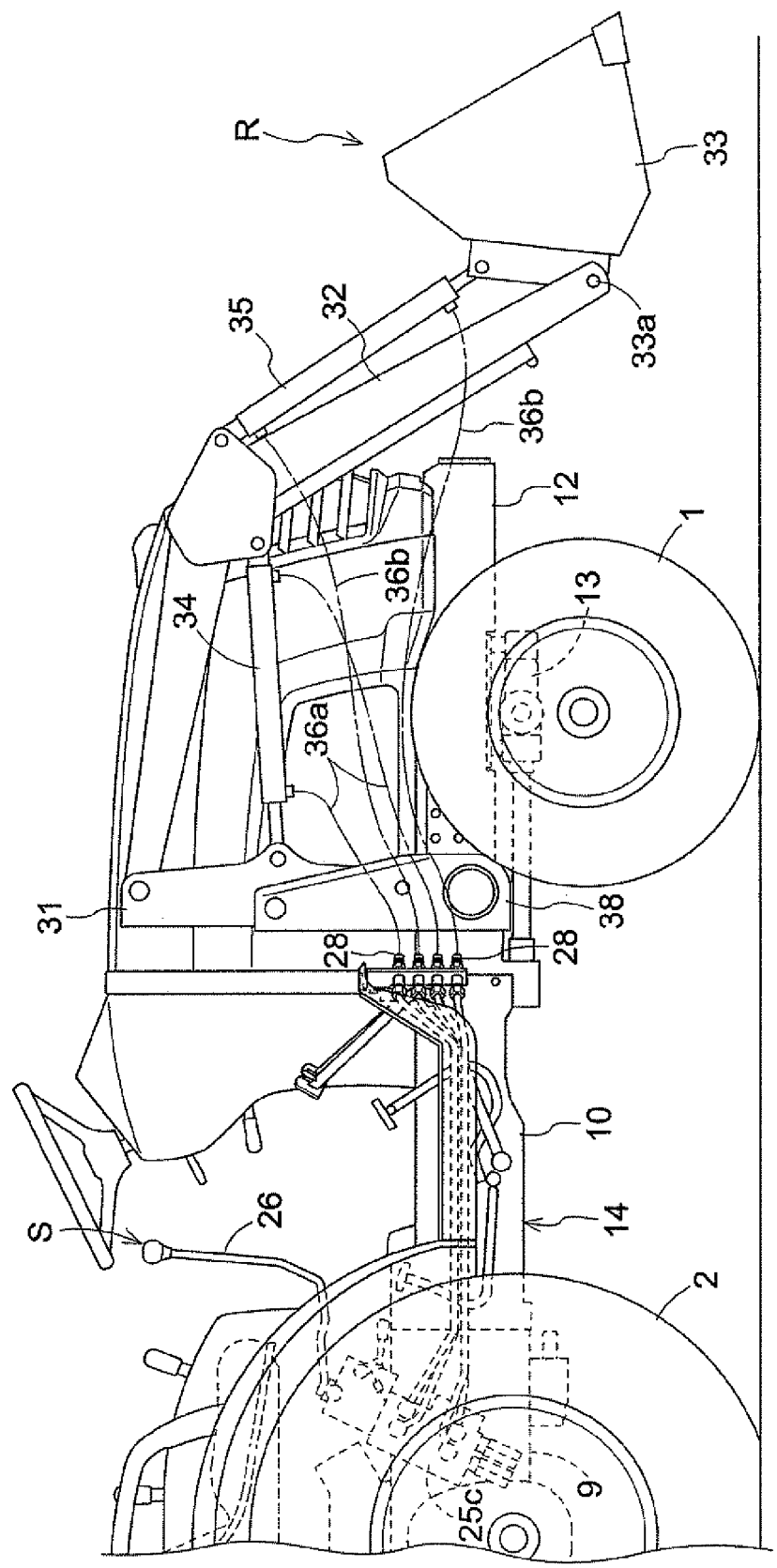
FIG. 3 is a side view of a work vehicle with a front loader.

FIG. 3 is a side view of a work vehicle with a front loader. As shown in this drawing, the work vehicle includes a front loader having: a pair of right and left loader support frames 38,38 detachably provided on a front portion of the body frame 14; and a pair of right and left brace frames 31,31 of a front loader unit R connected to the corresponding loader support frames 38,38.

As shown in FIG. 3, in addition to the pair of right and left brace frames 31,31, the front loader unit R includes: a pair of booms 32 each extending swingably in a vertical direction from an upper end portion of the corresponding brace frame 31; a bucket 33 supported swingably in a vertical direction by end portions of the booms 32; boom cylinders 34 each formed of a hydraulic cylinder connecting the corresponding frame 31 to the corresponding boom 32; and a pair of bucket cylinders 35 each formed of a hydraulic cylinder connecting the corresponding boom 32 to the bucket 33.

The pair of right and left boom cylinders 34,34 are configured to swing the booms 32,32 in a vertical direction relative to the brace frames 31,31, to thereby lift and lower the bucket 33. The pair of right and left bucket cylinders 35,35 are configured to swing the bucket 33 about an axis of a pivot shaft 33a, to thereby switch the bucket 33 between a lower soil-dumping state and an upper soil-scooping state.

Figure 4:
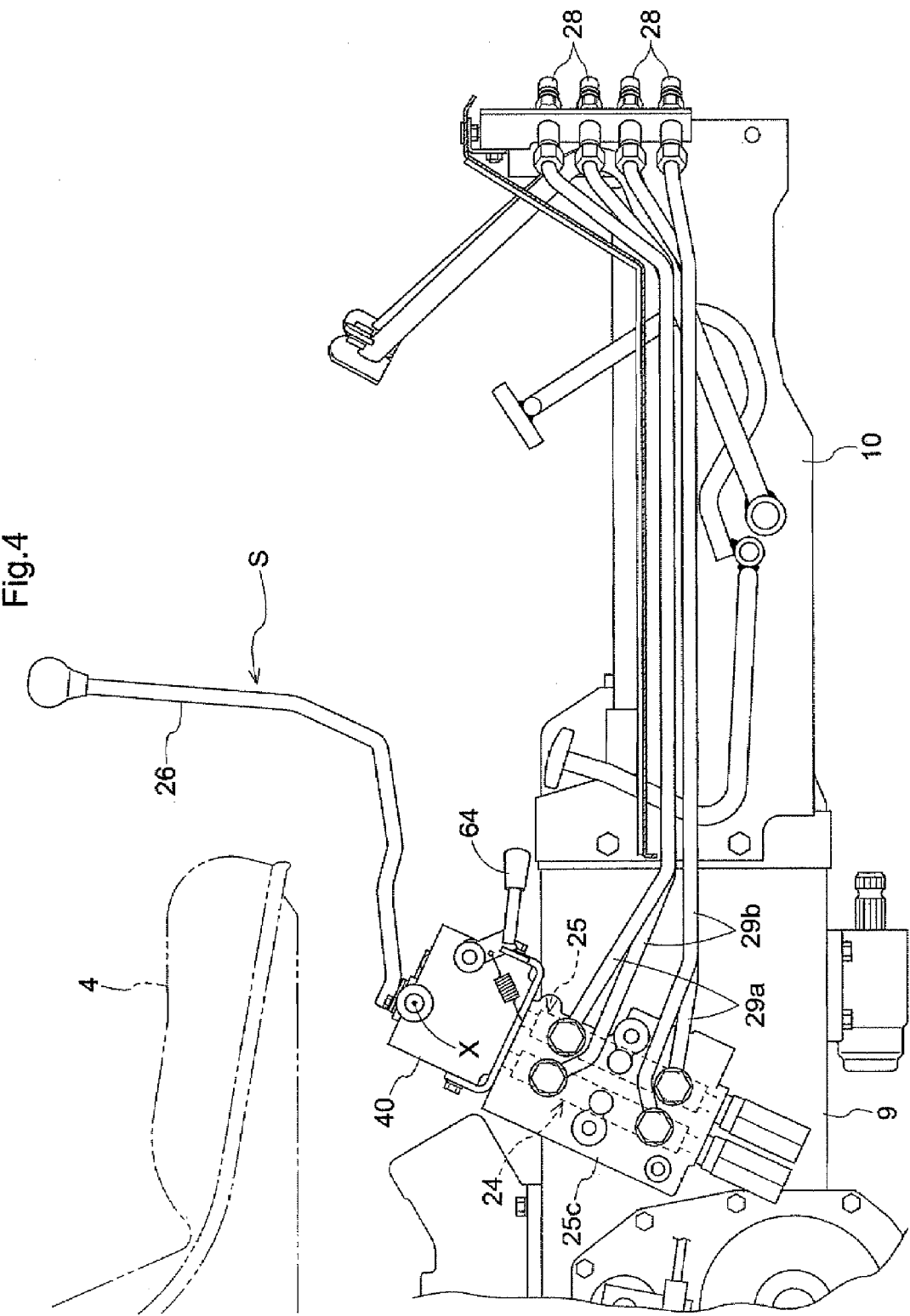
FIG. 4 is a side view of a portion with an operating device of the work vehicle.
Figure 5:
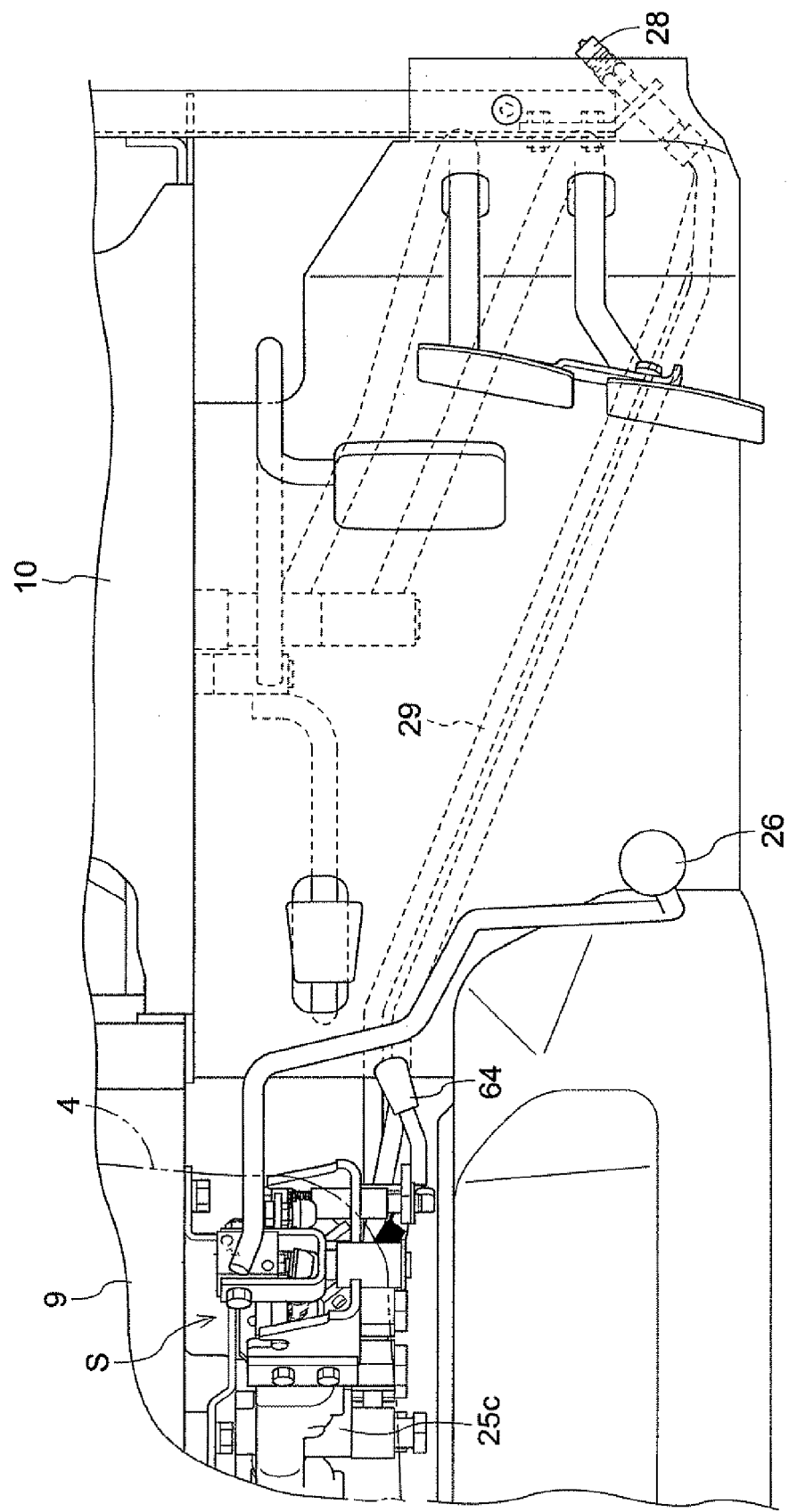
FIG. 5 is a plan view of the portion with the operating device of the work vehicle.

As shown in FIGS. 4 and 5, the work vehicle is provided with the operating device S having a single operating lever 26 on a lateral side of the driver's seat 4, by which the front loader unit R connected thereto is operated.

Next, the operating device S will be described.

Figure 6:
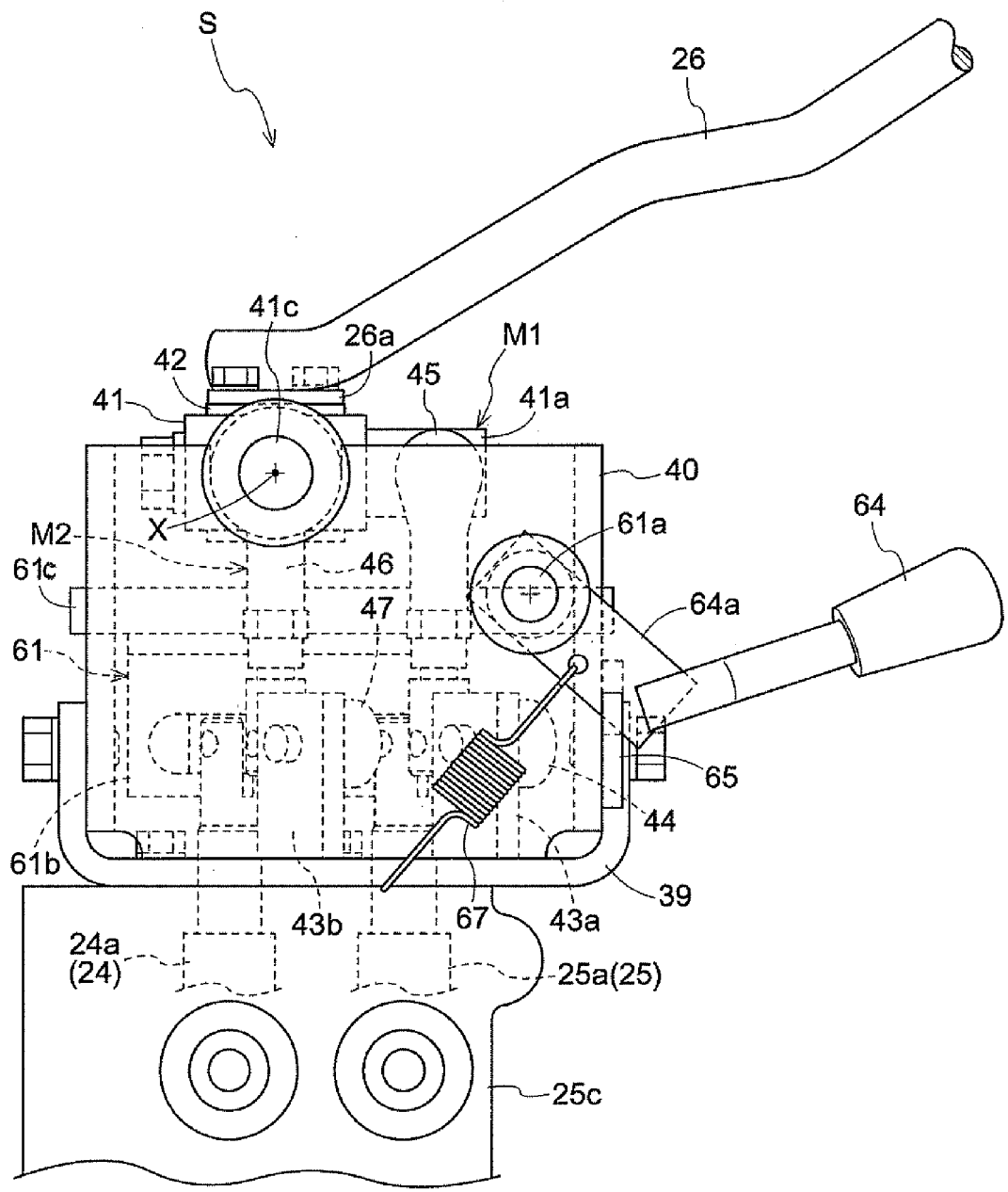
FIG. 6 is a side view of the operating device.
Figure 7:
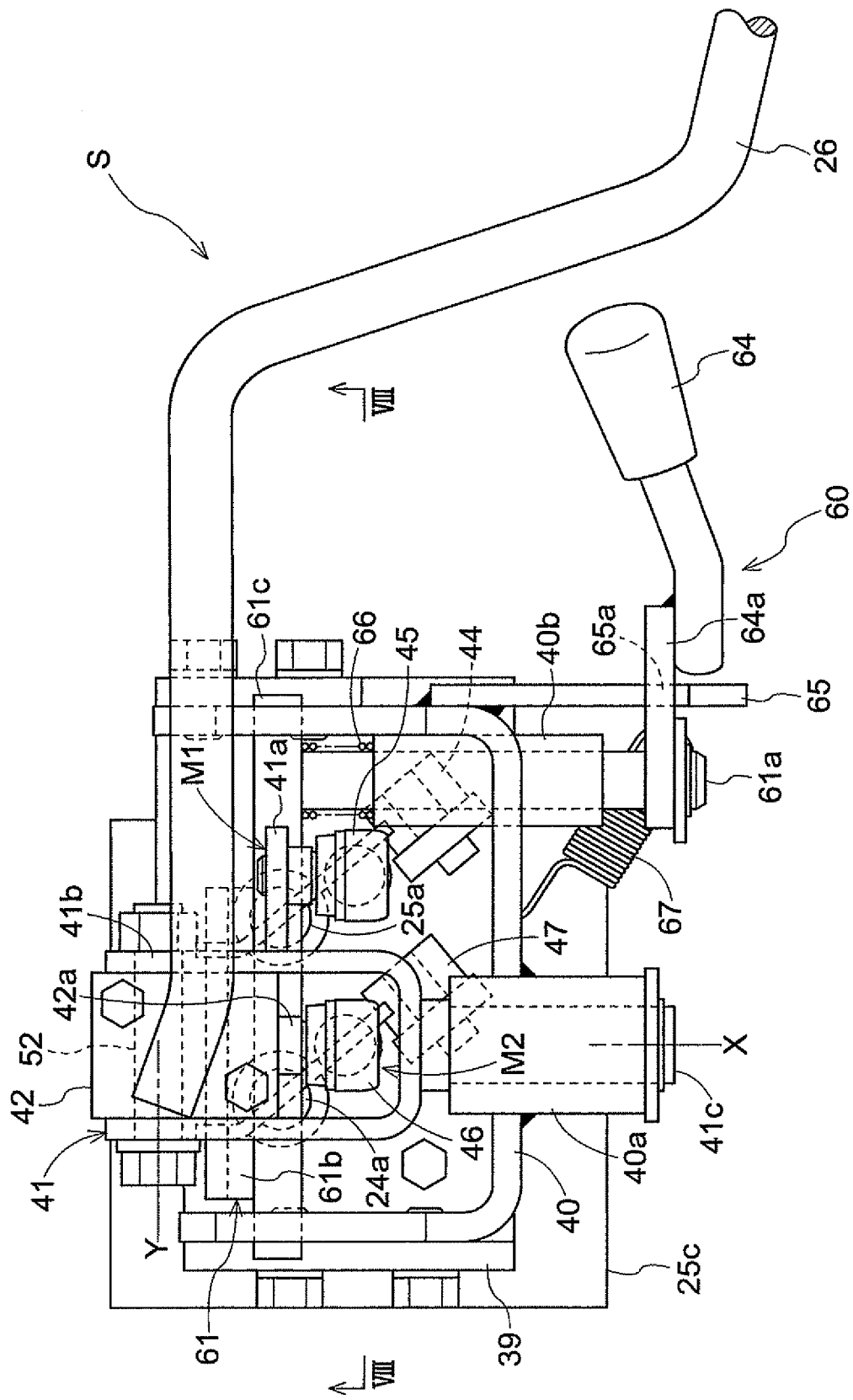
FIG. 7 is a plan view of the operating device.
Figure 8:
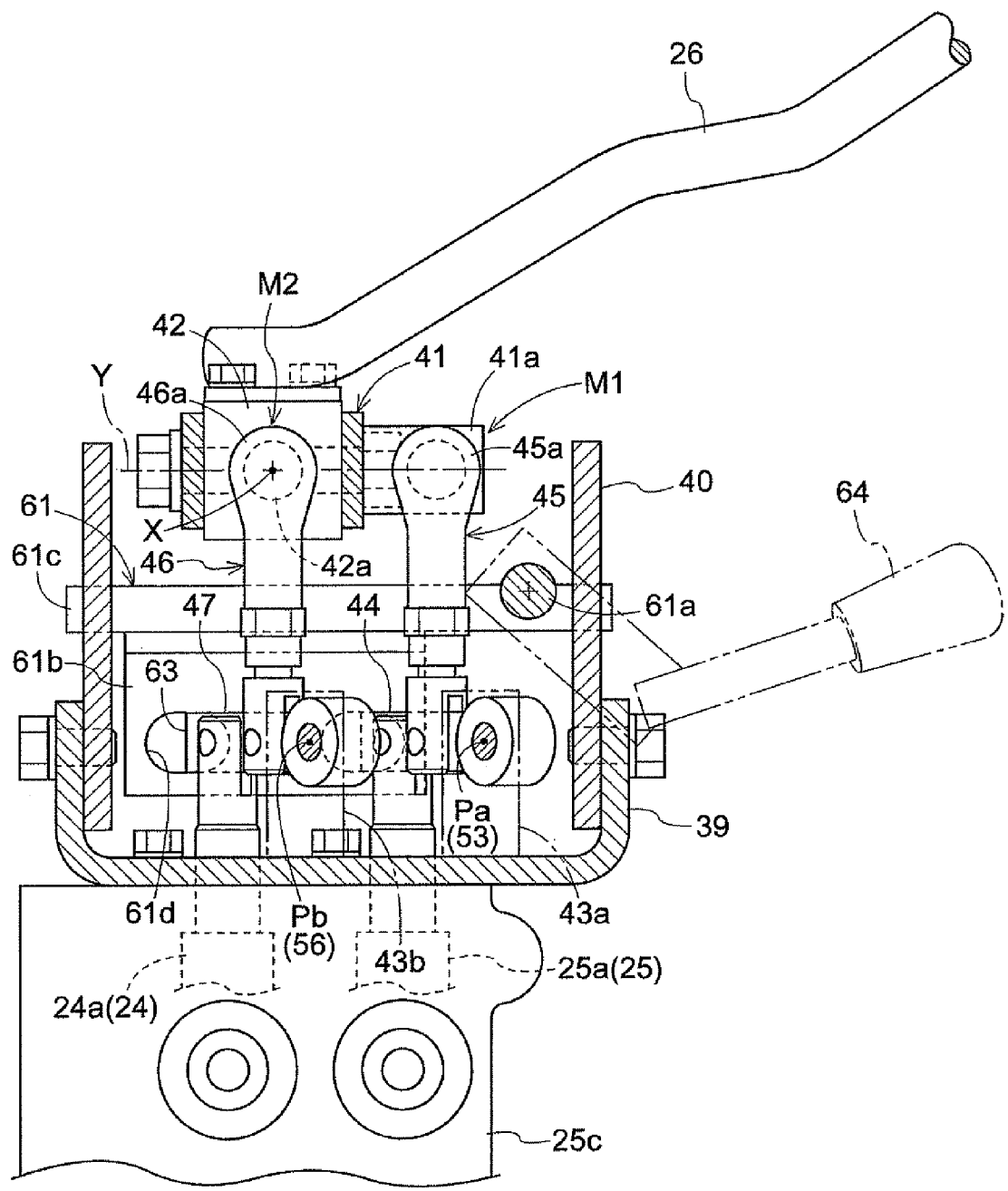
FIG. 8 is a cross section taken along a line VIII-VIII of FIG. 7.

FIG. 6 is a side view of the operating device S. FIG. 7 is a plan view of the operating device S. FIG. 8 is a cross section taken along a line VIII-VIII of FIG. 7. As shown in these drawings, in addition to the operating lever 26, the operating device S includes: a control valve 25 for the boom 32, having a slide spool 25a (hereinafter, referred to as "boom control valve 25"); a control valve 24 for the bucket, having a slide spool 24a (hereinafter, referred to as "bucket control valve 24"); an interlocking mechanism M1 on a boom side in which the operating lever 26 is interlocked with the slide spool 25a of the boom control valve 25 through a block-shaped lever support 42 and the like, whose upper face is connected with bolts to a connecting plate 26a provided at a base of the operating lever 26 (hereinafter, referred to as "boom-side interlocking mechanism M1"); and an interlocking mechanism M2 on a bucket side in which the operating lever 26 is interlocked with the slide spool 24a of the bucket control valve 24 through the lever support 42 and the like (hereinafter, referred to as "bucket-side interlocking mechanism M2").

A valve body of the boom control valve 25 and a valve body of the bucket control valve 24 are integrally formed as a single valve body 25c, which is supported by the transmission case 9.

As shown in FIGS. 3, 4 and 5, the boom control valve 25 is controllably connected to a pair of right and left boom cylinders 34,34 through a pair of valve-side hydraulic hoses 29a, 29a extending from the valve body 25c to a lateral side of the motor part and then through a pair of cylinder-side hydraulic hoses 36a,36a extending from one of the boom cylinders 34,34 of the front loader unit R to the lateral side of the motor part, at which the hoses 29a and 36a are connected with connectors 28. The pair of right and left boom cylinders 34,34 are further connected to each other through hydraulic hoses formed in the front loader unit R.

The bucket control valve 24 is controllably connected to a pair of right and left bucket cylinders 35,35 through a pair of valve-side hydraulic hoses 29b,29b extending from the valve body 25c to the lateral side of the motor part and through a pair of cylinder-side hydraulic hoses 36b,36b extending from one of the bucket cylinders 35,35 of the front loader unit R to the lateral side of the motor part, at which the hoses 29b and 36b are connected with the connectors 28. The pair of right and left bucket cylinders 35,35 are further connected to each other through hydraulic hoses formed in the front loader unit R.

Figure 12:
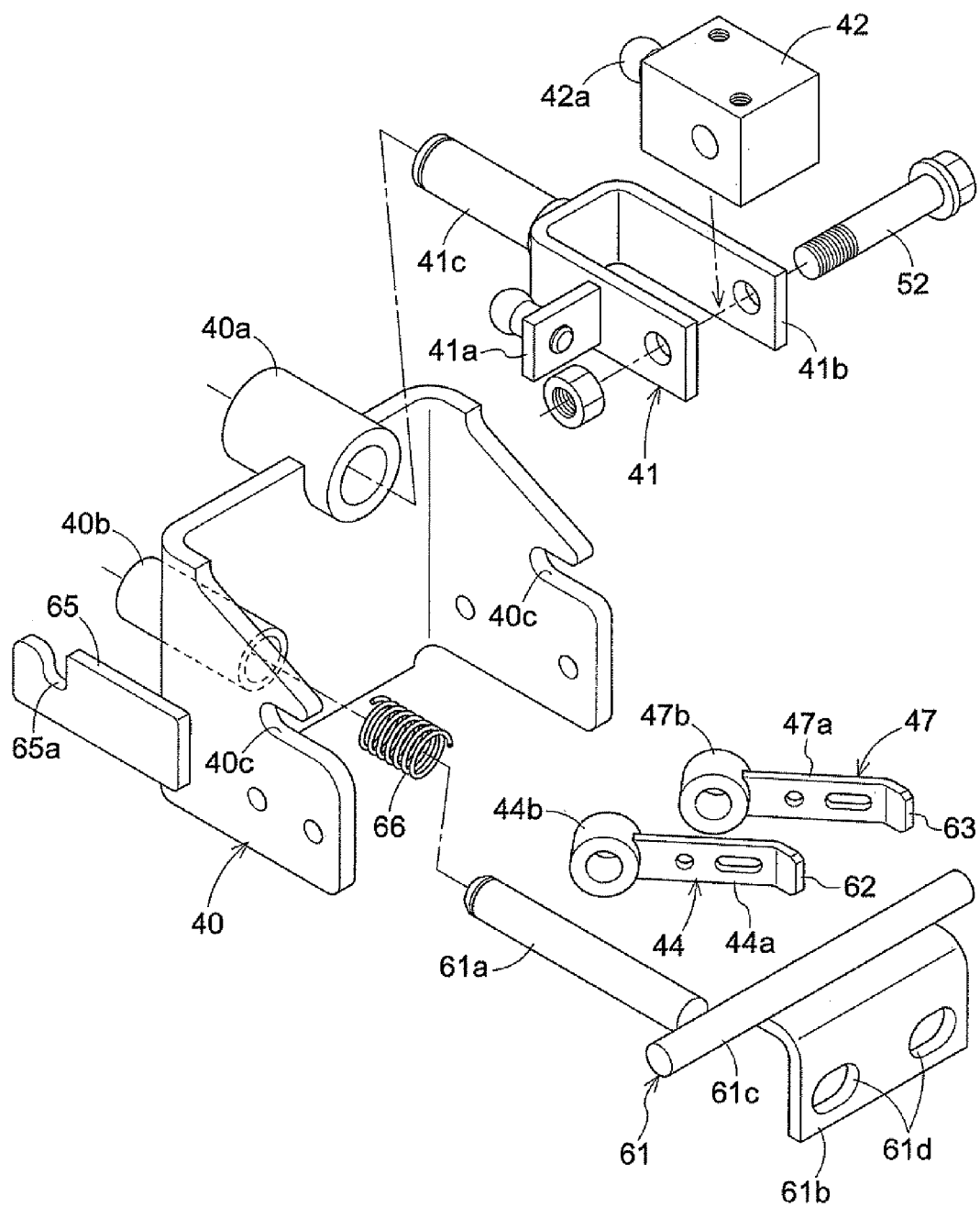
FIG. 12 is an exploded perspective view of the operating device.

FIG. 12 is an exploded perspective view of the operating device S. As shown in FIGS. 6 to 12, in addition to the lever support 42, the boom-side interlocking mechanism M1 includes: an interlocking body 41 having a two-pronged portion 41b sandwiching the lever support 42; an interlocking rod 45 whose upper end portion is connected to an arm portion 41a protruding from an outer face of the two-pronged portion 41b; a swing link 44 connected to a lower end portion of the interlocking rod 45 through a connecting pin 50 as an input member; and a connecting pin 51 connecting a free-end-side portion of the swing link 44 and an end portion of the slide spool 25a of the boom control valve 25.

The lever support 42 is supported by the interlocking body 41 through a pivot shaft 52 connecting an end side of the lever support 42 and tip end portions of the two-pronged portion 41b of the interlocking body 41, in such a manner that the lever support 42 is swingable with the operating lever 26 about an axis Y of the pivot shaft 52 relative to the interlocking body 41.

In addition to the two-pronged portion 41b and the arm portion 41a, the interlocking body 41 has a connecting shaft portion 41c extending from a base of the two-pronged portion 41b. The connecting shaft portion 41c is rotatably supported by a first cylindrical support portion 40a extending in a lateral direction of the vehicle body provided in an upper support 40 fixed to an upper portion of the valve body 25c through a lower support 39. The interlocking body 41 is swingable with the lever support 42 and the operating lever 26 about an axis X of the connecting shaft portion 41c in the lateral direction of the vehicle body.

The swing link 44 is provided with an arm portion 44a to which the interlocking rod 45 and the slide spool 25a are connected, and a connecting boss 44b positioned on a base end side of the arm portion 44a. The connecting boss 44b is rotatably supported through a pivot shaft 53 by a fixing portion 43a in a shape of a bracket provided on the lower support 39, and the swing link 44 is swingable about an axis Pa of the pivot shaft 53 in a vertical direction of the vehicle body, relative to the fixing portion 43a.

As shown in FIGS. 6 to 12, in addition to the lever support 42, the bucket-side interlocking mechanism M2 includes: an interlocking rod 46 whose upper end portion is connected to a connecting shaft portion 42a protruding from an end face of the lever support 42 on an opposite side to a side where the pivot shaft 52 is disposed; a swing link 47 connected to a lower end portion of the interlocking rod 46 through a connecting pin 54 as an input member; and a connecting pin 55 connecting a free end-side portion of the swing link 47 and an end portion of the slide spool 24a of the bucket control valve 24.

The swing link 47 is provided with an arm portion 47a to which the interlocking rod 46 and the slide spool 24a are connected, and a connecting boss 47b positioned on a base end side of the arm portion 47a. The connecting boss 47b is rotatably supported through a pivot shaft 56 by a fixing portion 43b in a shape of a bracket provided on the lower support 39, and the swing link 47 is swingable about an axis Pb of the pivot shaft 56 in the vertical direction of the vehicle body, relative to the fixing portion 43b.

The upper end portions of the interlocking rod 45 and interlocking rod 46 are connected to the arm portion 41a and the connecting shaft portion 42a, through universal joint portions 45a and 46a utilizing spheres, respectively. The lower support 39 is connected to the valve body 25c with bolts. The lower support 39 and the upper support 40 are connected with bolts.

Accordingly, in the operating device S, by swinging the operating lever 26 in the front-rear direction of the vehicle body about the axis X, extension of the pair of right and left boom cylinders 34,34 is performed or stopped, and by swinging the operating lever 26 in the lateral direction of the vehicle body about the axis Y, extension of the pair of right and left bucket cylinders 35,35 is performed or stopped.

In other words, when the operating lever 26 is swung about the axis X, the interlocking body 41 is also swung about the axis X together with the operating lever 26, which allows the arm portion 41a to swing the swing link 44 about the axis Pa through the interlocking rod 45. As a result, the swing link 44 pushes and pulls the slide spool 25a through the connecting pin 51, to thereby switch the boom control valve 25 among a neutral state, a lifting state and a lowering state.

On the other hand, when the operating lever 26 is swung about the axis Y (orthogonal to the axis X), the lever support 42 is also swung about the axis Y together with the operating lever 26, which allows the connecting shaft portion 42a to swing the swing link 47 about the axis Pb through the interlocking rod 46. As a result, the swing link 47 pushes and pulls the slide spool 24a through the connecting pin 55, to thereby switch the bucket control valve 24 among a neutral state, a lifting state and a lowering state.

Figure 9:
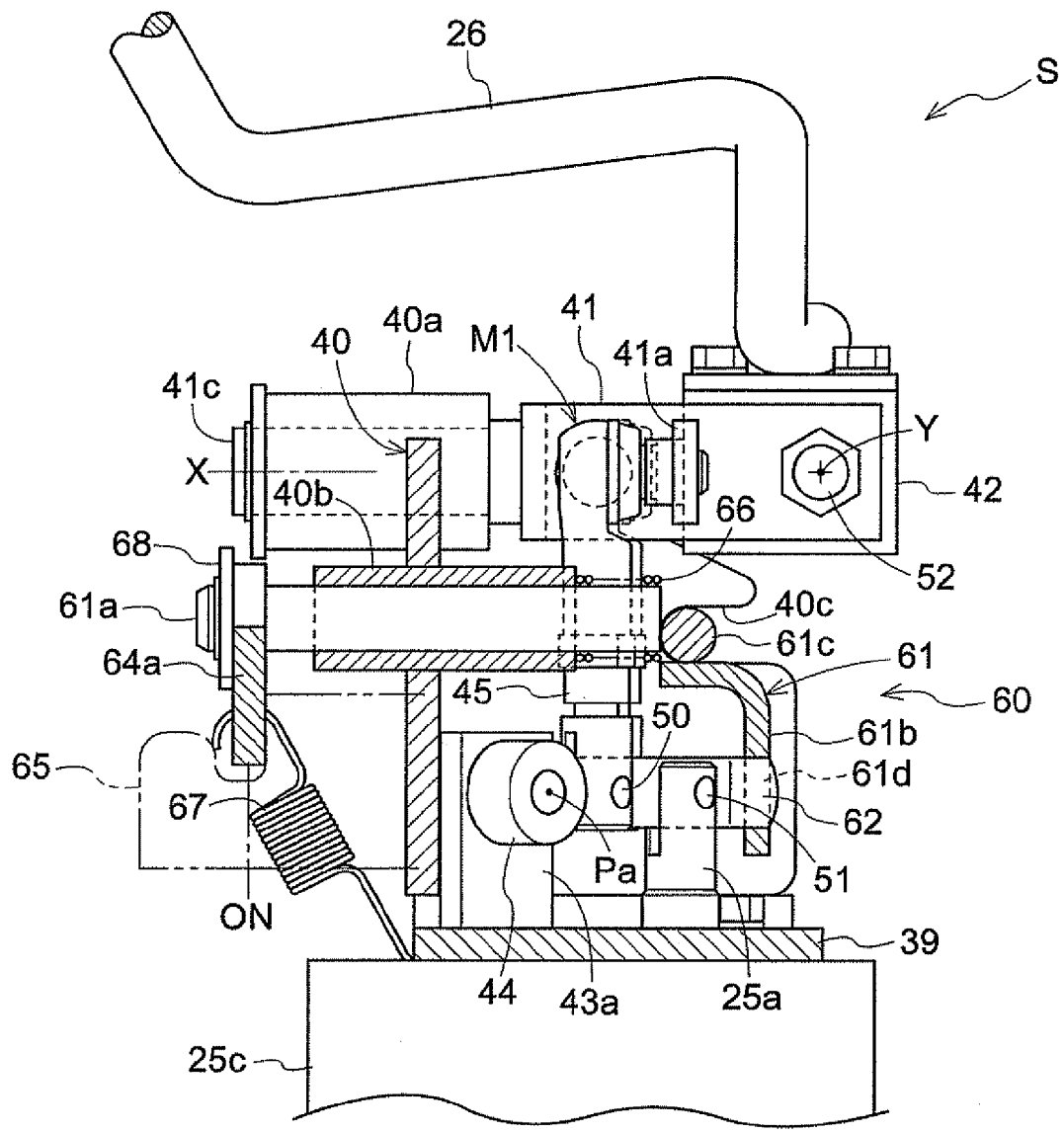
FIG. 9 is a front view of a lock mechanism at a lock position.

As shown in FIG. 9, the operating device S is provided with a lock mechanism 60 including a lock body 61 positioned downward of the lever support 42.

As shown in FIGS. 6 to 12, the lock body 61 is provided with a connecting shaft portion 61a and a lock plate 61b. In addition to the lock body 61, the lock mechanism 60 includes: a latch portion 62 provided on a free end portion of the swing link 44 of the boom-side interlocking mechanism M1 (hereinafter, referred to as "boom-side latch portion 62"); a latch portion 63 provided on a free end portion of the swing link 47 of the bucket-side interlocking mechanism M2 (hereinafter, referred to as "bucket-side latch portion 63); a locking lever 64 connected through a connecting plate portion 64a to an end portion of the connecting shaft portion 61a which end portion is opposite to an end to which the lock plate 61b is connected; a lever holder 65 supported on the upper support 40; a lock release spring 66 fitted onto the connecting shaft portion 61a; and a positioning spring 67 connected to the connecting plate portion 64a.

As shown in FIG. 12, in addition to the lock plate 61b and the connecting shaft portion 61a, the lock body 61 is provided with a spindle 61c connected to the lock plate 61b along an upper end portion of the lock plate 61b. The connecting shaft portion 61a is slidably supported by a second cylindrical support portion 40b of the upper support 40. Both ends of the spindle 61c are slidably supported by guide recesses (guides) 40c,40c formed in the upper support 40.

Specifically, the lock body 61 is configured to slide in an axial direction of the connecting shaft portion 61a relative to the upper support 40, by being guided through the pair of guide recesses 40c,40c. With a sliding movement of the lock body 61, the boom-side latch portion 62 is latched in or released from one of a pair of lock holes 61d,61d of the lock plate 61b, and the bucket-side latch portion 63 is latched in or released from the other lock hole 61d.

The connecting plate portion 64a of the locking lever 64 is rotatably fitted onto the connecting shaft portion 61a. A stopper ring 68 is provided on the end portion of the connecting shaft portion 61a in order to prevent the locking lever 64 from coming off.

FIG. 9 is a front view of the lock mechanism 60 at a lock position. FIG. 11A is a plan view of the lock mechanism 60 at a lock position. As shown in these drawings, when the locking lever 64 is moved to an end portion of the lever holder 65 (i.e. moved rightward) to reach a lock position (ON), the locking lever 64 is operated to be swung about an axis of the connecting shaft portion 61a to thereby engageably insert the connecting plate portion 64a into a positioning recess 65a formed in the end portion of the lever holder 65. The state in which the locking lever 64 is engaged with the lever holder 65 is maintained by the positioning spring 67, to thereby prevent the locking lever 64 from being returned by the return spring 66.

At the same time, the lock body 61 is slidably operated against the return spring 66 to a side on which the swing link 44 and the swing link 47 are present, to reach a lock state in which the lock plate 61b is latched with the boom-side latch portion 62 and the bucket-side latch portion 63 through the lock holes 61d,61d. In other words, even when the swing links 44 and 47 are allowed to swing to some extent due to shakiness of the boom-side latch portion 62 or the bucket-side latch portion 63 in the lock hole 61d, the lock body 61 secures the swing links 44 and 47 using the lock plate 61b, so as to limit further swing of the swing links 44 and 47.

With this configuration, when the lock mechanism 60 is shifted to a lock position, the boom control valve 25 is locked at a neutral state by securing the swing link 44 with the lock body 61, and at the same time, the bucket control valve 24 is locked at a neutral state by securing the swing link 47 with the lock body 61, by which the operating lever 26 is locked at a neutral position and the bucket 33 is locked at a desired height and swing posture.

FIG. 10 is a front view of the lock mechanism 60 at a lock release position. FIG. 11B is a plan view of the lock mechanism 60 at a lock release position. As shown in these drawings, when the locking lever 64 is operated to be swung about an axis of the connecting shaft portion 61a, the connecting plate portion 64a is released from the positioning recess 65a of the lever holder 65, and the locking lever 64 is moved to the base end side of the lever holder 65 by the return spring 66, to reach a release position (OFF).

At the same time, the lock body 61 is slidably operated away from the swing link 44 and the swing link 47 due to the return spring 66, to reach a release state in which the look plate 61b is separated from the boom-side latch portion 62 and the bucket-side latch portion 63, by which a securing of the swing links 44 and 47 by the lock plate 61b is cancelled.

With this configuration, when the lock mechanism 60 is shifted to a lock release position, locking of the boom control valve 25 at the neutral state is cancelled by separating the swing link 44 from the lock body 61, and at the same time, locking of the bucket control valve 24 at the neutral state is cancelled by separating the swing link 47 from the lock body 61, by which the locking of the operating lever 26 and bucket 33 is cancelled.

As shown in FIG. 11A, the latch portion 62(63) is formed in the swing link 44(47) on a free end side at a position farther than a connecting point with the connecting pin 51(55) from the swing shaft center Pa(Pb). In other words, in the swing link 44, a distance L1 from the swing shaft center Pa of the swing link 44 to the boom-side latch portion 62 is set larger than a distance L2 from the swing shaft center Pa to a point at which the connecting pin 51 is connected. In the swing link 47, a distance L1 from the swing shaft center Pb of the swing link 47 to the bucket-side latch portion 63 is set larger than a distance L2 from the swing shaft center Pb to a point at which the connecting pin 55 is connected.

Specifically, since the lock hole 61d of the lock body 61 has a size that allows easy latching of the boom-side latch portion 62 and the bucket-side latch portion 63, shakiness about the axis Pa occurs in the swing link 44 due to looseness in the boom-side latch portion 62 in the lock hole 61d, and shakiness about the axis Pb occurs in the swing link 47 due to looseness in the bucket-side latch portion 63 in the lock hole 61d, when the boom control valve 25 and the bucket control valve 24 are at the lock position by the lock body 61. However, looseness play) of the slide spool 25a caused in the boom control valve 25 due to the shakiness of the swing link 44 when the boom control valve 25 is at a lock position is suppressed to a level smaller than shakiness of the boom-side latch portion 62, and looseness of the slide spool 24a caused in the bucket control valve 24 due to the shakiness of the swing link 47 when the bucket control valve 24 is at a lock position is suppressed to a level smaller than shakiness of the bucket-side latch portion 63.

<Other Embodiments>

Instead of the boom-side interlocking mechanism M1 and bucket-side interlocking mechanism M2 as described above, other mechanism may be used in which the swing link 44 or the swing link 47 is connected to the slide spool 25a or the slide spool 24a through the a connection mechanism having an interlocking rod or the like, as well as the connecting pin 51 and the connecting pin 55. Accordingly, the connecting pins 51,55 may be also referred to as "output members 51,55".

Instead of the boom-side interlocking mechanism M1 as described above, other mechanism may by used in which the connecting pin 50 (input member) is disposed between a position at which the slide spool 25a of the swing link 44 is connected (a position of the connecting pin 51) and the boom-side latch portion 62. Instead of the bucket-side interlocking mechanism M2 as described above, other mechanism may be used in which the connecting pin 54 (input member) is disposed between a position at which the slide spool 24a of the swing link 47 is connected (a position of the connecting pin 55) and the bucket-side latch portion 63.

The present invention is applicable to various actuator-mounting devices, such as operating device for operating an actuator, e.g. cylinder, including the front dozer R, other than the above-described operating device.

What is claimed is:

1. An operating device with an operating lever for operating a control valve connected to an actuator comprising:
   an input member to which an operational displacement of the operating lever is transmitted;
   an output member connected to a slide spool of the control valve;
   a swing link configured to relay a displacement of the input member to the output member, the swing link being swingable about a swing shaft center defined on one end of the swing link, the swing link comprising:
      an intermediate portion extending from the swing shaft center, the intermediate portion being connected to the input member and the output member; and
      a latch portion formed at a free end of an extension from the swing shaft center over the intermediate portion, a distance between the latch portion and the swing shaft center being larger than a distance between the intermediate portion and the swing shaft center; and
   a lock body slidably operable between a lock position and a release position, the lock body being configured as a sliding body slidably guided between the lock position and the release position by a guide,
   wherein the lock body has a plate portion having a lock hole defined therein to receive the latch portion;
   the extension is bent at the intermediate portion and oriented toward an opening of the lock hole in a direction perpendicular to the opening;
   a swing motion of the swing link about the swing shaft center is limited by engaging the latch portion of the swing link at a neutral position with the lock hole defined in the lock body having slid to the lock position, and the control valve is locked to a neutral state; and
   the limitation to the swing motion of the swing link is cancelled by disengaging the latch portion from the lock hole after the lock body is operated to the release position, and the control valve is unlocked from the neutral state.

2. The operating device according to claim 1, wherein the output member is a connecting pin configured to connect the swing link and the slide spool.

3. The operating device according to claim 1, wherein the plate portion extending extends in a direction orthogonal to a sliding direction thereof.

4. An operating device with an operating lever for operating a control valve connected to an actuator comprising:
   a first input member to which a first operational displacement of the operating lever is transmitted;
   a second input member to which a second operational displacement of the operating lever is transmitted;
   a first output member connected to a slide spool of a first control valve;
   a second output member connected to a slide spool of a second control valve;
   a first swing link configured to relay a displacement of the first input member to the first output member, the first swing link being swingable about a first swing shaft center defined on one end of the first swing link, the first swing link comprising:
      a first intermediate portion extending from the first swing shaft center, the
         first intermediate portion being connected to the first input member and the first output member; and
      a first latch portion formed at a free end of a first extension from the first swing shaft center over the first intermediate portion, a distance between the first latch portion and the first swing shaft center being larger than a distance between the first intermediate portion and the first swing shaft center;
   a second swing link configured to relay a displacement of the second input member to the second output member, the second swing link being swingable about a second swing shaft center defined on one end of the second swing link, the second swing link comprising:
      a second intermediate portion extending from the second swing shaft center, the second intermediate portion being connected to the second input member and the second output member; and
      a second latch portion formed at a free end of a second extension from the second swing shaft center over the second intermediate portion, a distance between the second latch portion and the second swing shaft center being larger than a distance between the second intermediate portion and the second swing shaft center; and
   a lock body slidably operable between a lock position and a release position, the lock body being configured as a sliding body slidably guided between the lock position and the release position by a guide, wherein the lock body has a plate portion having a first lock hole defined therein to receive the first latch portion, and a second lock hole defined therein to receive the second latch portion;

wherein the first extension is bent at the first intermediate portion and oriented toward an opening of the first lock hole in a direction perpendicular to the opening, a swing motion of the first swing link about the first swing shaft center is limited by engaging the first latch portion of the first swing link at a neutral position with the first lock hole defined in the lock body having slid to the lock position, and the first control valve is locked to a neutral state; and the limitation to the swing motion of the first swing link is cancelled by disengaging the first latch portion from the first lock hole after the lock body is operated to the release position, and the first control valve is unlocked from the neutral state; and wherein the second extension is bent at the second intermediate portion and oriented toward an opening of the second lock hole in a direction perpendicular to the opening, a swing motion of the second swing link about the second swing shaft center is limited by engaging the second latch portion of the second swing link at a neutral position with the second lock hole defined in the lock body having slid to the lock position, and the second control valve is locked to a neutral state; and the limitation to the swing motion of the second swing link is cancelled by disengaging the second latch portion from the second lock hole after the lock body is operated to the release position, and the second control valve is unlocked from the neutral state.

5. The operating device according to claim 4, wherein directions of the first operational displacement and the second operational displacement of the operating lever are different.

6. The operating device according to claim 5, wherein directions of the first operational displacement and the second operational displacement of the operating lever are orthogonal to each other.

7. The operating device according to claim 4, wherein the plate portion extends in a direction orthogonal to a sliding direction thereof.

8. The operating device according to claim 4, wherein the first intermediate portion extends orthogonal to the first swing shaft center, the first extension extending in a sliding direction of the lock body; and the second intermediate portion extends orthogonal to the second swing shaft center, the second extension extending in a sliding direction of the lock body.

9. The operating device according to claim 1, wherein the intermediate portion extends orthogonal to the swing shaft center, the extension extending in a sliding direction of the lock body.

* * * * *

UNITED STATES PATENT AND TRADEMARK OFFICE
CERTIFICATE OF CORRECTION

| | | |
|---|---|---|
| PATENT NO. | : 8,468,905 B2 | Page 1 of 1 |
| APPLICATION NO. | : 12/402147 | |
| DATED | : June 25, 2013 | |
| INVENTOR(S) | : Kiyoshige Maezawa | |

It is certified that error appears in the above-identified patent and that said Letters Patent is hereby corrected as shown below:

In the Claims:

Column 10, Line 21, Claim 3, after "portion" delete "extending"

Column 10, Lines 38-41, Claim 4, delete "a first intermediate portion extending from the first swing shaft center, the
    first intermediate portion being connected to the first input member and the first output member; and" and insert -- a first intermediate portion extending from the first swing shaft center, the first intermediate portion being connected to the first input member and the first output member; and --

Signed and Sealed this
Nineteenth Day of November, 2013

Teresa Stanek Rea
*Deputy Director of the United States Patent and Trademark Office*